US008781297B2

(12) United States Patent
Lesser (10) Patent No.: US 8,781,297 B2
(45) Date of Patent: Jul. 15, 2014

(54) METHOD AND DISC DRIVE FOR PROVIDING A CONTENT ENTITY FROM A STORAGE DISC

(75) Inventor: Richard Lesser, Karlsruhe (DE)

(73) Assignee: Nero AG, Karlsbad (DE)

(*) Notice: Subject to any disclaimer, the term of this patent is extended or adjusted under 35 U.S.C. 154(b) by 784 days.

(21) Appl. No.: 12/429,629

(22) Filed: Apr. 24, 2009

(65) Prior Publication Data

US 2009/0271736 A1 Oct. 29, 2009

Related U.S. Application Data (60) Provisional application No. 61/047,635, filed on Apr. 24, 2008.

(51) Int. Cl.
*H04N 9/80* (2006.01)
*G06F 3/048* (2013.01)
*G06F 5/00* (2006.01)
*G06F 12/02* (2006.01)
*G11B 21/08* (2006.01)

(52) U.S. Cl.
USPC ..... 386/241; 345/543; 369/30.32; 369/30.76; 710/52; 710/56; 710/58; 710/61; 715/781; 715/804; 715/817; 715/839

(58) Field of Classification Search
USPC ............ 386/241, E9.023; 345/502, 504, 543; 348/E7.073; 375/E7.001; 703/23; 710/52, 56, 58, 61; 715/781, 804, 817, 715/839; 369/30.32, 30.76; G9B/27.012, G9B/27.019, 27.05, 27.051
See application file for complete search history.

(56) References Cited

U.S. PATENT DOCUMENTS

| 5,113,517 | A | * | 5/1992 | Beard et al. | 703/23 |
| 5,721,956 | A | * | 2/1998 | Martin et al. | 710/52 |
| 6,532,197 | B1 | * | 3/2003 | Cheung | 369/30.32 |
| 2004/0240848 | A1 | * | 12/2004 | Seo et al. | 386/95 |

* cited by examiner

*Primary Examiner* — Daquan Zhao
*Assistant Examiner* — Syed Hasan
(74) *Attorney, Agent, or Firm* — Michael A. Glenn; Perkins Coie LLP (57) ABSTRACT

A method for providing a content entity from a storage disc is described. The storage disc comprises at least one further content entity. Each content entity comprises a main menu and at least one submenu accessible via the main menu. The storage disc further comprises an entity selection menu. The entity selection menu comprises a link to the main menu of the content entity to be provided. The method comprises providing the entity selection menu for reproduction, receiving a selection of the content entity to be provided, detecting that the storage disc comprises a plurality of content entities, mapping a pre-defined start address to a different start address and providing the selected content entity for reproduction based on the different start address. The pre-defined start address is mapped to a different start address of the storage disc associated with the main menu of the selected content entity to be provided.

12 Claims, 6 Drawing Sheets

METHOD AND DISC DRIVE FOR PROVIDING A CONTENT ENTITY FROM A STORAGE DISC

CROSS-REFERENCE TO RELATED APPLICATIONS

This application claims priority from U.S. patent application Ser. No. 61/047,635, which was filed on Apr. 24, 2008, and is incorporated herein in its entirety by reference.

FIELD OF THE INVENTION

The present invention relates to the field of reproduction of contents of storage discs and, more particularly, to the field of providing a content entity from a storage disc comprising a plurality of content entities.

BACKGROUND OF THE INVENTION

With every new generation of storage discs, the storage capacity of these discs are increased. For example, new blue-laser drives are coming now in bigger quantities to the Market. However, there is a lot of content available in the legacy DVD format only. This problem will occur with every introduction of a new generation of storage means. Therefore, it is of great interest to handle the contents of old generation storage devices using new generation storage means.

SUMMARY OF THE INVENTION

Embodiments according to the invention relate to a method for providing a content entity from a storage disc. The storage disc comprises the content entity to be provided and at least one further content entity. Each content entity stored on the storage disc comprises a main menu and at least one submenu accessible by a the main menu. The storage disc further comprises an entity selection menu. The entity selection menu comprises a link to the main menu of the content entity to be provided and a link to the main menu of the further content entity. The method comprises providing the entity selection menu for reproduction, receiving a selection of the content entity to be provided based on the entity selection menu, detecting that the storage disc comprises a plurality of content entities, mapping a pre-defined start address to a different start address and providing the selected content entity for reproduction based on the different start address. The pre-defined start address required by a player host software is mapped to a different start address of the storage disc associated with the main menu of the selected content entity to be provided. The mapping is based on the detection that the storage disc comprises a plurality of content entities.

Further embodiments of the invention relate to a disc drive for providing a content entity from a storage disc. The storage disc comprises the content entity to be provided and at least one further content entity. Each content entity comprises a main menu and at least one submenu accessible via the main menu. The storage disc further comprises an entity selection menu. The entity selection menu comprises a link to the main menu of the content entity to be provided and a link to the main menu of the further content entity. The disc drive comprises an input interface, a multi-entity detector, a mapping means and an output interface. The input interface is configured to receive a selection of the content entity to be provided based on the entity selection menu. The multi-entity detector is configured to detect that the storage disc comprises a plurality of content entities. The mapping means is configured to map a pre-defined start address required by a player host software to a different start address of the storage disc associated with the main menu of the selected content entity to be provided. The mapping is based on the detection that the storage disc comprises a plurality of content entities. The output interface is configured to provide the entity selection menu for reproduction and configured to provide the selected content entity for reproduction based on the different start address.

Other embodiments of the invention relate to a storage disc comprising a plurality of content entities and an entity selection menu. Each content entity of the plurality of content entities comprises a main menu and at least one submenu accessible via the main menu. The entity selection menu comprises a link to the main menu of each content entity of the plurality of content entities.

Further embodiments of the invention relate to a method for producing a storage disc. The method comprises storing an entity selection menu on the storage disc and storing a plurality of content entities on the storage disc. Each stored content entity of the plurality of content entities comprises a main menu and at least one submenu accessible via the main menu. The stored entity selection menu comprises a link to the main menu of each stored content entity of the plurality of content entities.

BRIEF DESCRIPTION OF THE DRAWINGS

Embodiments according to the invention will be explained in greater detail in the following with reference to the accompanying Figures, in which.

In the following, the same reference numerals are partly used for objects and functional units having the same or similar functional properties and the description thereof with regard to a figure shall apply also to other figures in order to reduce redundancy in the description of the embodiments.

DETAILED DESCRIPTION OF THE EMBODIMENTS

Figure 1:
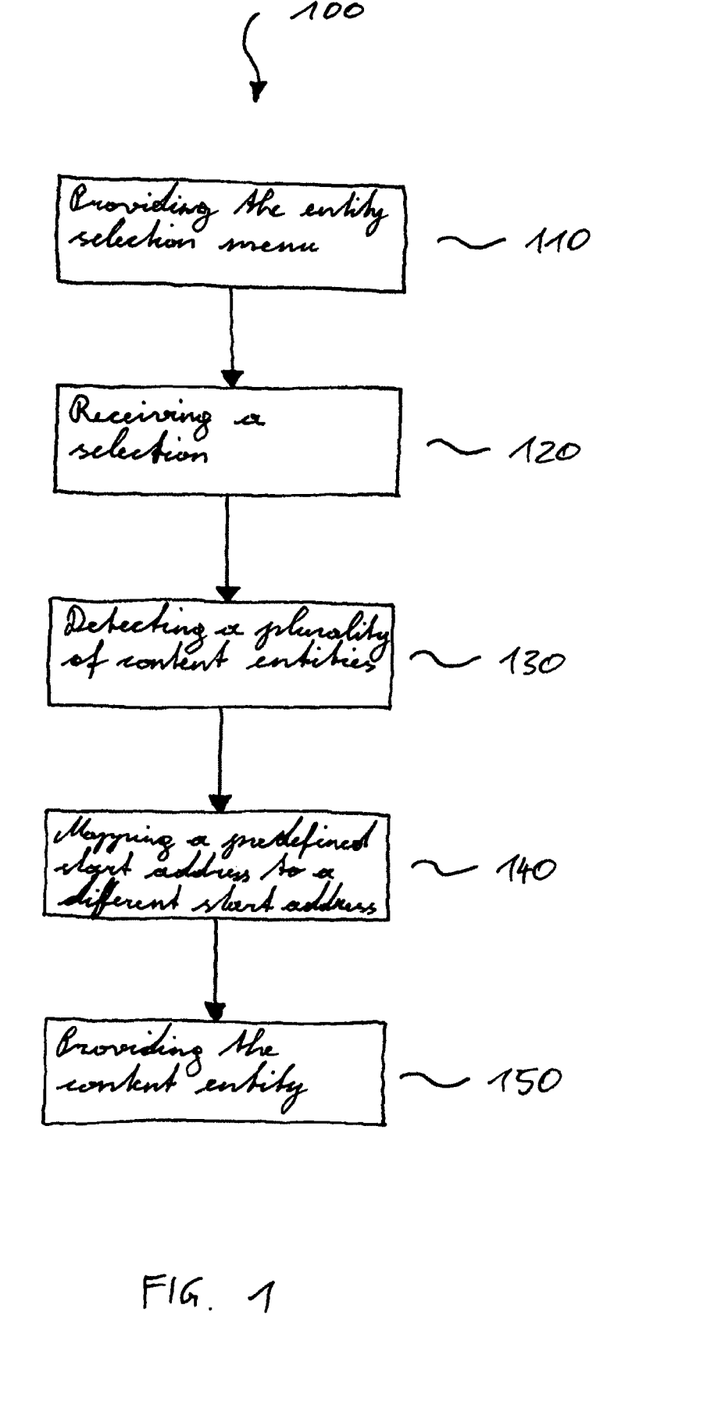
FIG. 1 is a flow chart of a method for providing a content entity from a storage disc.

FIG. 1 shows a flow chart of a method 100 for providing a content entity from a storage disc. The storage disc contains the content entity to be provided and at least one further content entity. Each content entity stored on the storage disc comprises a main menu and at least one submenu accessible via the main menu. The storage disc further contains an entity selection menu, the entity selection menu comprising a link to the main menu of the content entity to be provided and a link to the main menu of the further content entity. The method comprises providing 110 the entity selection menu for reproduction, receiving 120 a selection of the content entity to be provided based on the entity selection menu, detecting 130 that the storage disc contains a plurality of content entities, mapping 140 a pre-defined start address to a different start address and providing 150 the selected content entity for reproduction based on the different start address. The predefined start address required by a player host software is mapped 140 to a different start address of the storage disc associated with the main menu of the selected content entity to be provided. The mapping 140 is based on the detection that the storage disc contains a plurality of content entities.

A content entity may be, for example, a movie or a data content. For example, a movie comprises a main menu including selection possibilities for playing the movie, selecting a chapter and/or choosing a language. In this example, selecting a chapter and choosing a language refers to a sub-menu.

The player host software may decode and reproduce a content stored on the storage disc. Usually, a main menu of a content entity stored on the storage disc is accessible by the player host software, only if the main menu is located at a pre-defined start address. Therefore, usually only a main menu of one content entity can be reproduced. By using the described concept, it may be possible to reproduce a plurality of content entities stored on a storage disc.

A pre-defined start address may be an absolute address value pointing to a particular sector of the storage disc or may be determined by searching for a file containing the main menu with a pre-defined file name.

For example, if a content entity is a DVD-video content, the video data is stored in a folder called VIDEO_TS and the file containing the main menu is called VIDEO_TS.IFO.

Mapping the pre-defined start address required by the player host software to a different start address associated with the main menu of a content entity allows an access to this main menu, although this main menu is not located at the pre-defined start address. In this way, the different start address takes the place of the pre-defined start address for the player host software.

Instead of one of the main menu of a content entities stored on the storage disc, the entity selection menu may be located at the pre-defined start address. For example, according to the examples mentioned before the entity selection menu is located at the sector on the storage disc corresponding to the pre-defined absolute start address or the entity selection menu is stored in a folder called VIDEO_TS and in a file called VIDEO_TS.IFO in a way that the player host software finds the folder containing the entity selection menu first by the player host software.

In this way, the entity selection menu is provided for reproduction first and a selection of the content entity to be provided may be received from an user interface.

Since the entity selection menu is linked to the main menus of the content entities stored on the storage disc, the main menu of each content entity may be accessed by mapping the pre-defined start address to the start addresses of the main menus of the content entities. A link to a main menu of a content entity may be realized, for example, by storing the absolute start address of the content entities or a relative address between the pre-defined start address and the start addresses of the content entities.

For example, mapping the pre-defined start address to the different start address may be done by replacing the pre-defined start address by a different start address stored on the storage disc. A storage location of the different start address may be located within a storage region of the content associated with the entity selection menu. Alternatively the mapping my be done by adding the pre-defined start address and an address offset, wherein the address offset is stored on the storage disc. A storage location of the address offset may be located within a storage region of a content associated with an entity selection menu. In other words, the information, which is necessary for the mapping, may be stored together with the entity selection menu.

In difference to the entity selection menu, which is linked to the main menus of the content entities, the main menus of the content entities are not linked to the entity selection menu. For example, the storage disc contains a plurality of movies each representing an independent content entity. These movies may be created originally to be stored on a disc with a storage capacity large enough for only one movie. Therefore, it was created to start at a pre-defined start address. By using the described concept, such contents can be reproduced, although they are not starting at the pre-defined start address without adapting the content entity. In this way, it is possible to store a plurality of these content entities on a storage disc with higher storage capacity and to reproduce them without any changes of the content entities. Only an entity selection menu, which is linked to the main menus of the content entities, may be generated and stored on the storage disc based on the pre-defined start address. For example, several DVDs may be stored on a blue-laser disc.

Detecting that the storage disc comprises a plurality of content entities may be done after receiving 120 the selection, for example, by detecting that the link to the main menu of the selected content entity leads to an address outside of the content containing the entity selection menu. In other words, for example, it may be detected that the player host software requests an address not contained by the content comprising the entity selection menu. Alternatively, a status parameter stored on the storage disc may be detected, which indicates that the storage disc contains a plurality of content entities. The status parameter may be a bit or flag, which can be set.

Mapping the start address is based on detecting that the storage disc comprises a plurality of content entities, since the mapping may only be done, if such a storage disc is detected.

By using the described concept, a plurality of content entities created to be stored on a legacy storage means, for example, a DVD, can be provided from one new generation storage means or storage disc, for example, a blue-laser disc, without adapting the content entities. Additionally, an adaptation of the legacy player host software may not be necessary.

Figure 2:
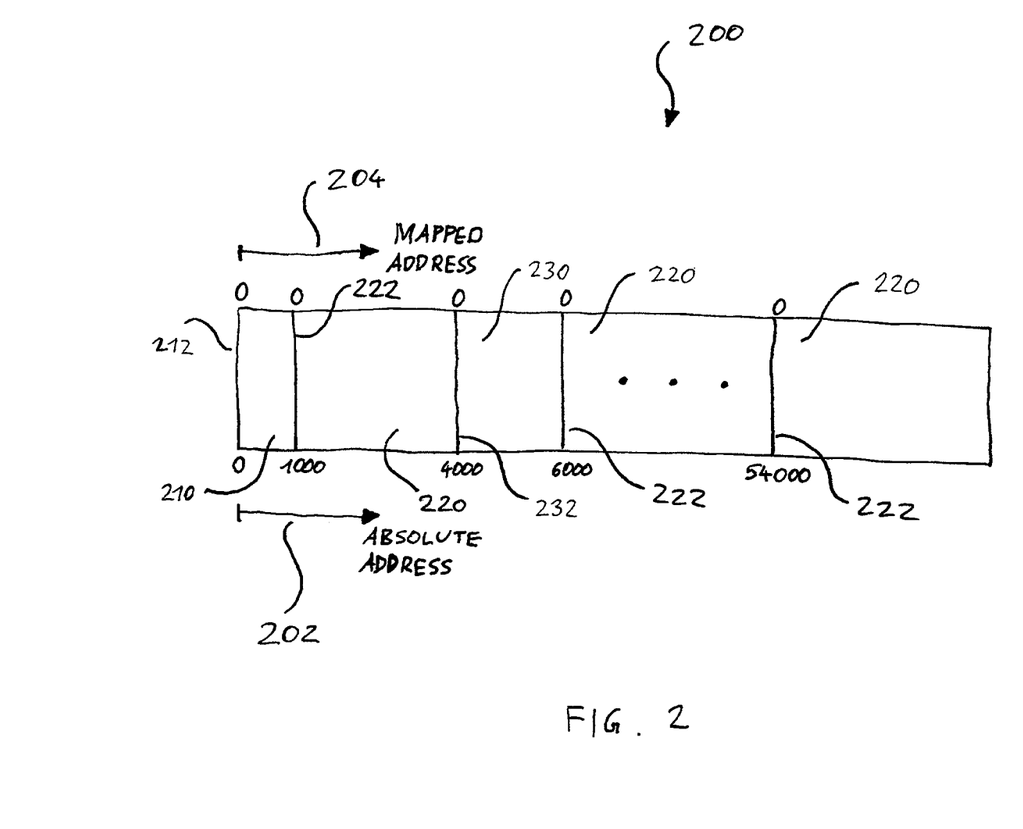
FIG. 2 shows a schematic illustration of a content of a storage disc.

FIG. 2 shows a schematic illustration of a content 200 of a storage disc. It shows the content 210 containing the entity selection menu and a plurality of content entities 220, 230. The content 210 comprising the entity selection menu is located at the pre-defined start address 212. Each content entity 220, 230 is associated with a different start address 222, 232. At one side of the schematic illustration of the content 200 an example for absolute addresses 202 for the pre-defined start address 212 and for the different start addresses 222, 232 is shown. On the other side an example for the corresponding mapped addresses 204 of the pre-defined start address 212 and the different start addresses 222, 232 of the content entities 220, 230 is indicated. If, for example, the second content entity 230 is selected to be provided, the pre-defined start address 212, which is indicated in this example as 0, is mapped to the different start address 232 of the content entity 230 to be provided, which is indicated with 4000 in this example. In this way, the main menu of the content entity 230 to be provided may be found and reproduced by the player host software.

The content entities may be stored as illustrated in FIG. 2 one after the other or they may be multiplexed, for example, sector 1 of content entity 1 followed by sector 2 of content entity 2 and so on or sector 1 of content entity 1 followed by sector 1 of content entity 2 and so on.

Figure 3:
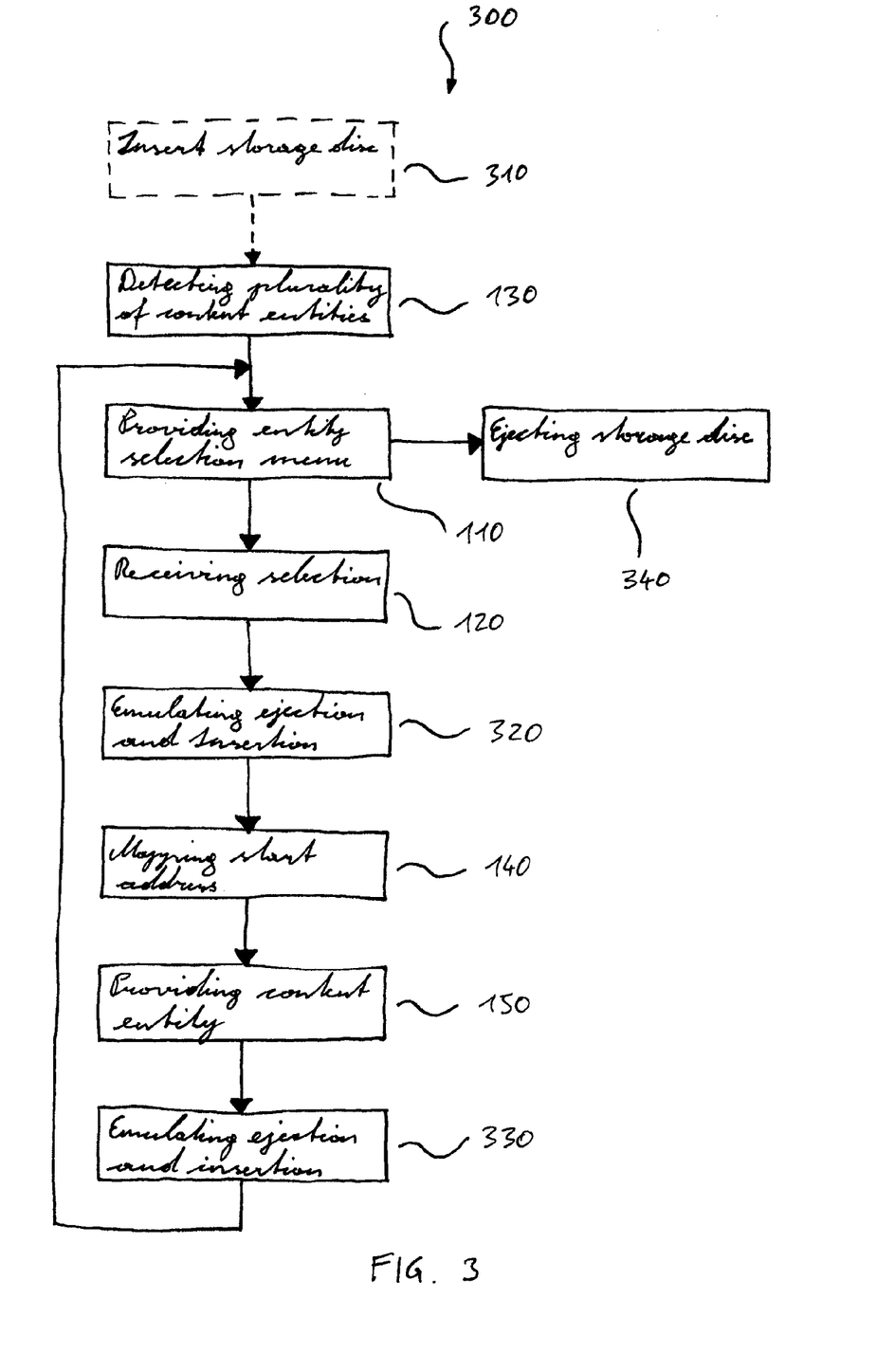
FIG. 3 is a flow chart of a method for providing a content entity from a storage disc.

FIG. 3 shows a flow chart of a method 300 for providing a content entity from a storage disc according to an embodiment of the invention. The method 300 corresponds to the method shown in FIG. 1. However, several steps are added and detecting 130 that the storage disc contains a plurality of content entities is done before providing 110 the entity selection menu.

After inserting 310 the storage disc into a disc drive, it may be detected 130 that the storage disc comprises a plurality of content entities. This may be done, for example, by reading a status parameter from the storage disc. Then, the entity selection menu is provided 110 for reproduction and a selection of a content entity to be provided may be received 120 based on the entity selection menu. Based on this selection and the knowledge that the storage disc with a plurality of content entities is inserted, an ejection of the storage disc and insertion of another disc is emulated 320 to the player host software by providing an ejection signal and by providing an insertion signal to the player host software. Accompanying the emulated 320 insertion of another disc, the pre-defined start address is mapped 140 to the different start address associated with the main menu of the selected content entity to be provided. Then, the selected content entity or at least a part of the selected content entity, which may be, for example, the main menu of the selected content entity, is provided 150 for reproduction based on the different start address. After finishing the reproduction of at least a part of the selected content entity, an ejection of the other disc and insertion of the storage disc may be emulated 330 to the player host software after receiving an eject signal from the player host software and by providing an insertion signal to the player host software. In other words, after providing the selected content entity an ejection signal may be received from the player host software and the emulation 330 of the ejection and insertion may be done. Then, the entity selection menu is provided 110 once again. If no further content entity should be provided, the storage disc may be ejected 340 by receiving of a selection of an eject button or eject menu item contained by the entity selection menu, for example, in terms of receiving an eject signal from the player host software.

During the emulated ejections and insertions, the storage disc may stay in the disc drive. Only the pre-defined start address is mapped 140 to a different start address to get access to the content entity to be provided.

During providing 150 the selected content entity an address jump may be mapped to a different address depending on which address concept is used within the content entity. For example, if an address jump is indicated relative to the current address, a further mapping of the address during providing the selected content entity is not necessary. If an address jump refers to an absolute address, the address may be mapped, for example, corresponding to the difference between a pre-defined start address and the different start address associated with the content entity to be provided, also during providing the selected content entity.

The storage disc may comprise a file structure, wherein each content entity is stored in a different folder. The folders may comprise all the same folder name. Also the entity selection menu is stored in such a folder with the same folder name as the content entities. The main menus of the content entities are stored in different files located in the corresponding folders, wherein the different files of the main menus comprise all the same file name. Furthermore, the entity selection menu is also stored in a file with the same file name. For example, in the case of DVD video contents, each folder has the name VIDEO_TS and the files comprising the main menu and entity selection menu comprise the name VIDEO_TS.IFO. In this case, it should be ensured that the file comprising the entity selection menu should be found first by the player host software.

For example, the storage disc may be a blue-laser disc containing the content of a plurality of DVDs each comprising a single movie and each representing a content entity. After insertion 310 of the blue-laser disc, it is detected 130 that a plurality of content entities is stored on the blue-laser disc. An entity selection menu may be provided 110 for reproduction, which is stored at the predefined start address and which may show a list of available movies on the blue-laser disc and an eject button or eject menu item. Selecting the eject button in the entity selection menu may get the disc drive to eject the blue-laser disc. If one of the movies is selected, an ejection of the blue-laser disc and an insertion of a DVD containing the selected movie is emulated 320. The player host software requests the content stored at the pre-defined start address, which is mapped 140 to the different start address associated with the main menu of the selected movie. Therefore, the main menu of the selected movie and/or the selected movie itself can be provided for reproduction. The main menu of the movie may be provided to a user by the player host software as if a DVD with the single movie is inserted. A user may select a language or chapter by the submenus or watch the movie. If the eject button of the main menu of the selected movie is selected, an ejection of the DVD and insertion of the blue-laser disc is emulated 330. The player host software requests once again a content at the pre-defined start address, which is now not mapped to a different start address anymore, and therefore the entity selection menu is provided 110 once again.

Figure 4:
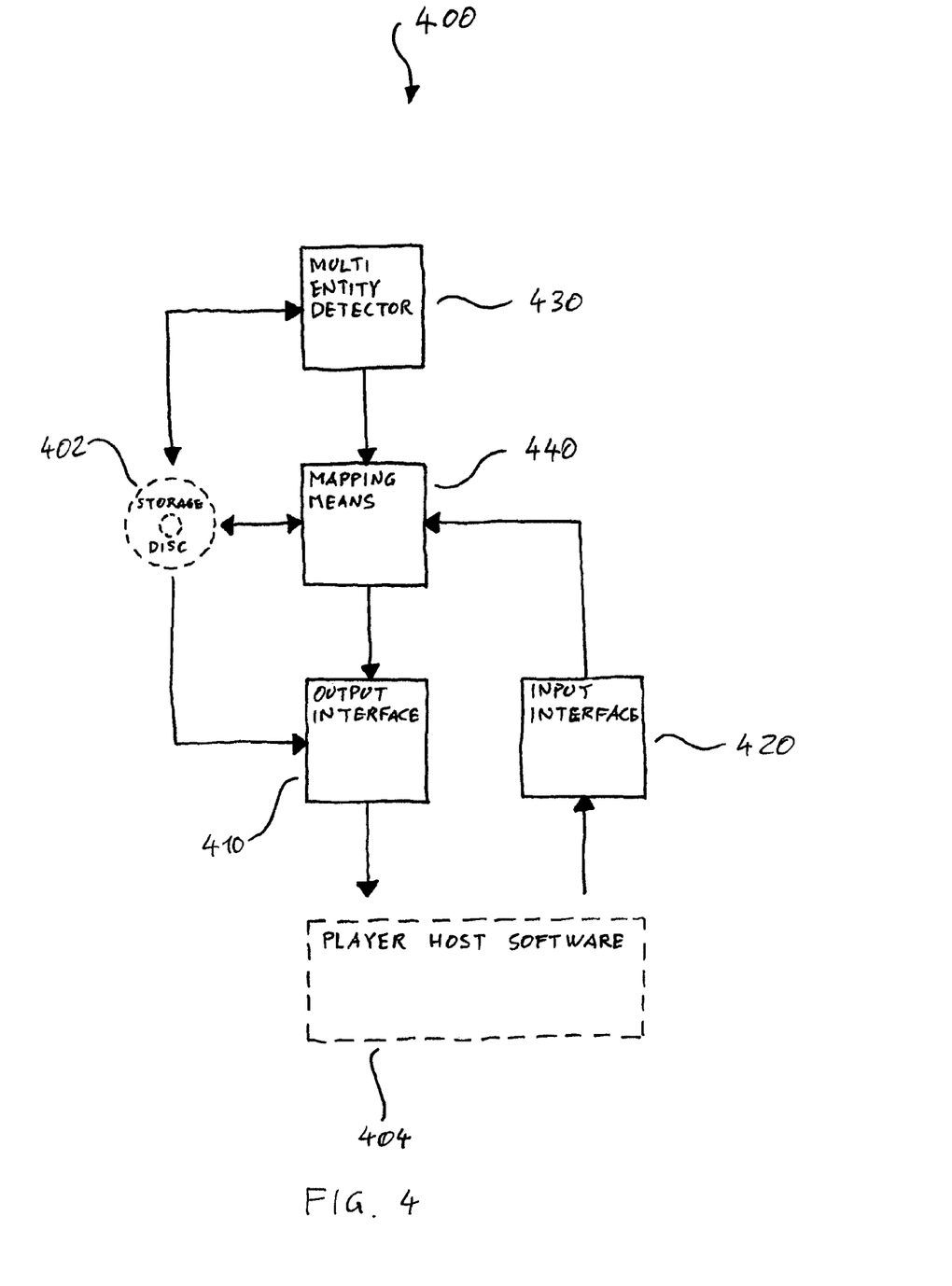
FIG. 4 is a block diagram of a disc drive for providing a content entity from a storage disc.

FIG. 4 shows a block diagram of a disc drive 400 for providing a content entity from a storage disc 402 according to an embodiment of the invention. The disc drive 400 comprises an output interface 410, an input interface 420, a multi-entity detector 430 and a mapping means 440. Additionally, FIG. 4 shows the storage disc 402 and a player host software 404, which are illustrated for better understanding, although they may not be a part of the disc drive 400.

The multi-entity detector 430 is connected to the mapping means 440, the mapping means 440 is connected to the output interface 410 and the input interface 420 is connected to the mapping means 440.

The storage disc 402 comprises the content entity to be provided and at least one further content entity. Each content entity comprises a main menu and at least one submenu accessible via the main menu. The storage disc 402 further comprises an entity selection menu. The entity selection menu comprises a link to the main menu of the content entity to be provided and a link to the main menu of the further content entity. The input interface 420 receives a selection of the content entity to be provided based on the entity selection menu. The multi-entity detector 430 detects that the storage disc 402 contains a plurality of content entities. The mapping means 440 maps a pre-defined start address required by the player host software 404 to a different start address of the storage disc 402 associated with the main menu of the selected content entity to be provided. The mapping is based on the detection that the storage disc 402 comprises a plurality of content entities. The output interface 410 provides the entity selection menu for reproduction and provides the selected content entity for reproduction based on the different start address.

The disc drive 400 may comprise a disc reader, which reads data from the storage disc 402 and provides the data to the multi-entity detector 440, the mapping means 440 and/or the output interface 410.

The multi-entity detector 430 and the mapping means 440 may be realized as independent hardware, as a micro controller or computer or as a software executed on a micro controller or computer.

Figure 5:
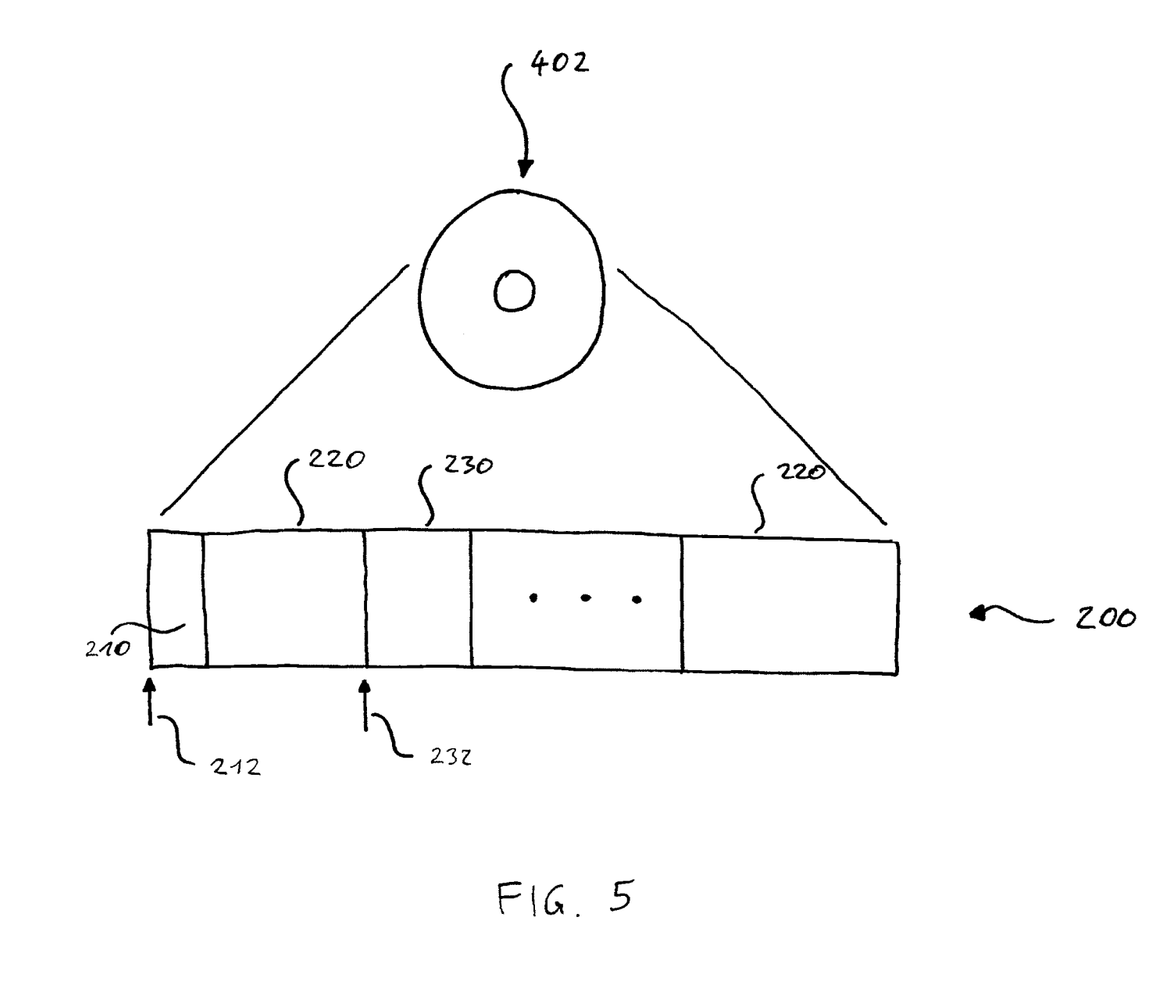
FIG. 5 shows a schematic illustration of a storage disc.

FIG. 5 shows a schematic illustration of a storage disc 402 according to an embodiment of the invention. The storage disc 402 comprises a plurality of content entities 220, 230. Each content entity 220, 230 of the plurality of content entities comprises a main menu and at least one submenu accessible via the main menu. Further, the storage disc 402 comprises an entity selection menu 210 comprising a link to the main menu of each content entity of the plurality of content entities.

Additionally, corresponding to FIG. 2, FIG. 5 shows an example for a content 200 of a storage disc 402 also indicating the pre-defined start address 212 and the different start address 232 of the content entity 230 to be provided.

Figure 6:
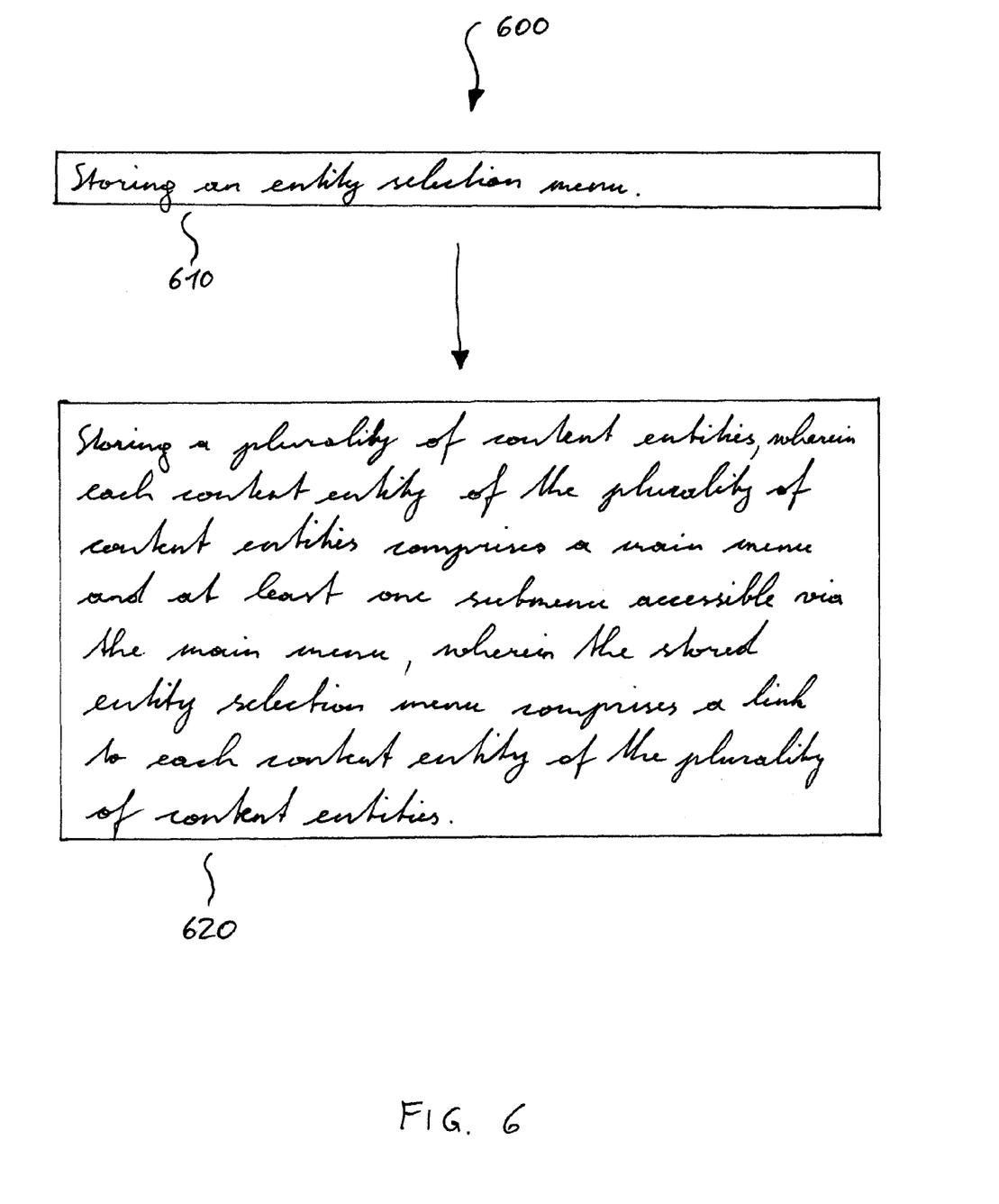
FIG. 6 is a flow chart of a method for producing a storage disc.

FIG. 6 shows a flow chart of a method 604 for producing a storage disc according to an embodiment of the invention. The method 600 comprises storing 610 an entity selection menu on the storage disc and storing 620 a plurality of content entities. Each content entity of the plurality of content entities comprises a main menu and at least one submenu accessible via the main menu. The entity selection menu comprises a link to the main menu of each content entity of the plurality of content entities.

Some embodiments of the invention relate to an emulation of several virtual discs of the last generation on one disc of a new generation.

Further embodiments of the invention comprise an emulation functionality to bridge the gap, in order to have multiple legacy discs on, for example, one blue-laser disc emulated including ejecting and inserting of discs for legacy host software compatibility. For example, his would allow multiple DVD format titles to be available on one single blue-laser disc (Data-DVDs, DVD-Videos, etc.), and accessible with host software not prepared for such formats.

In other embodiments, generations after blue-laser with DVD and blue-laser formats will be useful for this purpose as well, once a new format will replace blue-laser. Generally, a high-capacity disc will have to be sufficient to store at least two earlier lower capacity discs such as DVDs.

For example, currently the new blue-laser formats are focused on HD-playback of one film, and so there is a clear lack of the following, to make such blue-laser devices a lot more attractive: saving of multiple legacy formats (e.g. DVD-Video) on a single disc.

It would be very attractive to make this invention available as a drive-only-feature, so that legacy host software would not need to be changed in any way. This could be achieved by the following exemplary collection of steps (example below for DVD-Video).

First, the user inserts such new blue-laser disc which will emulate it to the host software as one physical DVD-Video inserted. The first logical DVD-Video on the disc (which is the first of several DVD-Videos on this disc, which are saved for example sequentially one after the other, or multiplexed into each other, for example Sector 1, Disc 1, Sector 2, Disc 2, . . . , Sector n, Disc n, Sector n+1, Disc 1, . . . ) will show the user the choice of the different titles available on the disc, which is a kind of summary and a means for selecting the different titles on the disc, i.e., a "Title-Selector" or entity selection menu. Sending eject to the drive (or hitting the eject button) will at this stage eject the disc.

Then, if the user selects one of the titles in the Title-Selector/Table of Contents through the legacy DVD-navigator, then the device will emulate to the host software an eject and re-insert of a disc by the user (but in reality the disc will be kept in the drive). One embodiment in which this is achieved automatically is that the action will be triggered by the fact that the host is requesting reading from a sector outside such Title-Selector DVD-Video (outside the entity selection menu). Then, after an emulated re-insert, the DVD-Video will be read from exactly this sector as a starting sector.

Once the playback is finished or the user wants to stop watching such DVD-Video, the user presses "stop" and "eject" and now, instead of really physically ejecting the disc the drive will emulate an eject re-insert of the Title-Selector disc to the host software and the Table of Contents is again displayed for a further selection or for finally ejecting the disc from the drive by again pressing "stop" or "eject".

The steps mentioned above include the step of emulating virtual sector numbers, which need to be mapped to the real sector numbers so that legacy software will see that after re-inserting. The sector number of the DVD-disc may start with 0, and can random access to this virtual number scheme.

In other embodiments, the formats can be mixed.

Some embodiments of the invention are directed to a new disc drive or the operating system of the new disc drive. The new disc drive is to be compatible with existing host software. This host software may be, in the case of a personal computer, the personal computer software. In the case of a consumer electronics DVD player, this software may be part of the consumer electronics DVD player. The host software, thus, may be the software actually doing the user interaction, the decoding of the DVD-video etc. Thus, the same host software may be useful for reading straight-forward DVDs, which only have a single main menu with several submenus, but which all are related to a single movie. Although, commercially available DVDs have several submenus relating to the main movie and some bonus tracks etc., the submenus are all related to a single specific movie. This is the case, for example, for commercially available DVDs.

The novel reader (disc drive) is, in addition, in the position to handle new media, such as blue-laser discs, which have, due to their huge capacity of available data storage, the possibility to store the contents of several DVDs. The first "DVD" stored on this high-capacity storage medium may act as a "table of contents" (entity selection menu) of the high-capacity medium, the table of contents may include for each DVD, e.g. a start addressor or an address offset of the information for this DVD as stored on the blue-laser disc. Specifically, the table of contents may include for each DVD stored on the blue-laser disc an identification of the DVD such as a title, an ID number or any other unique meta information. In association to this identification, the table may include a start address of the data block of this DVD on the high-capacity disc, or an address offset indicating the address difference between the start address of the data block of this DVD on the high-capacity disc and a predetermined start address, a legacy DVD player would require, etc. Alternatively or additionally, the table of contents may include a calculation rule for determining the date of this DVD. This embodiment is specifically useful for a multiplexed storage on the high-capacity DVD as discussed above.

For example, as soon as the novel player (disc drive) has determined that a new medium is inserted, this first "table of contents" DVD is displayed to the user, and the user then selects via the legacy DVD navigator included in the host software on a PC or a consumer electronic device, for example the third DVD. The starting address of the third DVD on the high-capacity storage is, of course, different from the predetermined start address, a legacy host software is expecting.

In view of this situation, the new disc drive may emulate to the host software an eject and re-insert. Different from the first insertion of the disc, however, the disc drive now activates an address translation feature. In response to the emulated eject and re-insert operation, the host software again requires a straight-forward predetermined start address on which the host software expects to find the main menu of disc No. 4. The new disc drive does not provide the information at this start-address, since this would be the DVD 1 table of contents, but may divert this read request to the start address of the fourth DVD. This can be done, for example, by adding a certain address offset, which can be equal to the actual start address of the selected DVD or the start address requested from the host software. Now, the legacy host software displays the main menu of the selected fourth DVD.

In response to the user selection of a menu item, such as "play main movie", the host software accesses the DVD by forwarding a certain sector information or address information to the new drive. Due to the fact that the new drive is now in the "emulation mode", the new drive does not access the inserted medium at the requested address, but translates (maps) this address, for example, by adding the start address as an address offset to the requested address. This results in the situation that a main movie of the fourth DVD is now accessed by the legacy host software, although the legacy host software still feels that a regular DVD having only a single menu is included in the disc drive.

When this drive is in the emulation mode (for example by detecting that the storage disc comprises a plurality of content entities), a "stop" or "eject" section will not result in an ejection of the disc, but will result in an eject and re-insert, but without any address translation. Thus, the first DVD menu, which is the table of contents of the high-capacity storage device is displayed for selection by the user.

When the user again selects "stop" or "eject", then the high-capacity disc will be ejected. If the user, however, selects any DVD from the displayed content, then the above procedure is repeated, but with a different address translation or a different address of said depending on the start address of the user-selected DVD.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

Although some claims only relate to one other claim, also a combination with further claims may be possible.

In particular, it is pointed out that, depending on the conditions, the inventive scheme may also be implemented in software. The implementation may be on a digital storage medium, particularly a floppy disk or a CD with electronically readable control signals capable of cooperating with a programmable computer system so that the corresponding method is executed. In general, the invention thus also consists in a computer program product with a program code stored on a machine-readable carrier for performing the inventive method, when the computer program product is executed on a computer. Stated in other words, the invention may thus also be realized as a computer program with a program code for performing the method, when the computer program product is executed on a computer.

The invention claimed is:

1. Method for providing a content entity from a storage disc, the method comprising:

providing an entity selection menu for reproduction from a storage disc, the storage disc comprising the content entity to be provided and at least one further content entity, wherein each content entity comprises a main menu and at least one submenu accessible via the main menu, and wherein the storage disc further comprises the entity selection menu, wherein the entity selection menu comprises a link to the main menu of the content entity to be provided and a link to the main menu of the further content entity;

receiving a selection of the content entity to be provided based on the entity selection menu, the selection indicating a selected content entity;

detecting that the storage disc comprises a plurality of content entities;

mapping a pre-defined start address required by a player host software to a different start address of the storage disc associated with the main menu of the selected content entity to be provided, wherein the mapping is based on the detecting that the storage disc comprises a plurality of content entities; and providing the selected content entity for reproduction based on the different start address, the step of providing comprising subsequent to receiving a selection of the content entity, emulating an ejection of the storage disc and an insertion of another disc by providing an ejection signal to the player host software and by providing an insertion signal to the player host software, wherein the different start address is used for providing the selected content entity to the player host software after the emulated insertion of the other disc.

2. Method according to claim 1, further comprising:

emulating an ejection of the other disc and an insertion of the storage disc by receiving an ejection signal from the player host software and by providing an insertion signal to the player host software, wherein the pre-defined start address is used after the emulated insertion of the storage disc; and providing again the entity selection menu for reproduction.

3. Method according to claim 1, wherein no content entity stored on the storage disc comprises a link to the entity selection menu.

4. Method according to claim 1, wherein the storage disc comprises a file structure, wherein the main menu of the content entity to be provided, the main menu of the further content entity and the entity selection menu are stored in different files, wherein the different files of the menus comprise all the same file name, wherein the file of the main menu of the content entity to be provided is associated with the different start address, and wherein the file of the entity selection menu is associated with the pre-defined start address.

5. Method according to claim 1, wherein detecting that the storage disc contains a plurality of content entities is based on detecting that the selection of the content entity to be provided results in an address jump to an address outside an address range of a content of the storage disc associated with the entity selection menu.

6. Method according to claim 1, wherein the storage disc comprises a status parameter, wherein the detection that the storage disc contains a plurality of content entities is based on the status parameter.

7. Method according to claim 1, wherein the content entity to be provided is created for being stored on a single content entity disc, wherein a single content entity disc contains only one content entity, wherein the content entity is stored on the storage disc without adaptation for being stored on the storage disc comprising a plurality of content entities.

8. Method according to claim 1, wherein mapping the pre-defined start address to the different start address comprises replacing the pre-defined start address by a different start address stored on the storage disc, wherein a storage location of the different start address is located within a storage region of the content associated with the entity selection menu, or comprises adding the pre-defined start address and an address offset, wherein the address offset is stored on the storage disc, wherein a storage location of the address offset is located within a storage region of a content associated with an entity selection menu.

9. Method according to claim 1, wherein a content entity stored on the storage disc comprises a movie.

10. Method according to claim 1, wherein each content entity stored on the storage disc comprises a movie.

11. Disc drive for providing a content entity from a storage disc, the disc drive comprising:
- an input interface configured to receive a selection of a content entity to be provided based on an entity selection menu, the storage disc comprising the content entity to be provided and at least one further content entity, wherein each content entity comprises a main menu and at least one submenu accessible via the main menu, and wherein the storage disc further comprises the entity selection menu, wherein the entity selection menu comprises a link to the main menu of the content entity to be provided and a link to the main menu of the further content entity, wherein, the selection indicates a selected content entity;
- a multi-entity detector configured to detect that the storage disc contains a plurality of content entities;
- an address mapper configured to map a pre-defined start address required by a player host software to a different start address of the storage disc associated with the main menu of the selected content entity to be provided, wherein the mapping is based on the detection that the storage disc comprises a plurality of content entities; and
- an output interface configured to provide the entity selection menu for reproduction and configured to provide the selected content entity for reproduction based on the different start address, wherein the output interface is configured to emulating an ejection of the storage disc and an insertion of another disc by providing an ejection signal to the player host software and by providing an insertion signal to the player host software, subsequent to the input interface receiving a selection of the content entity, wherein the output interface is configured to use the different start address for providing the selected content entity to the player host software after the emulated insertion of the other disc.

12. Non-transitory storage medium having stored thereon a computer program with a program code for performing the method according to one of claims 1 to 10, when the computer program runs on a computer or a microcontroller.

\* \* \* \* \*